Aug. 11, 1970    W. G. COLLINS    3,523,403
MEANS FOR MAKING DISPLAY PACKAGES
Filed July 26, 1967    3 Sheets-Sheet 1

INVENTOR
WILLIAM GEORGE COLLINS
BY Jacobs & Jacobs

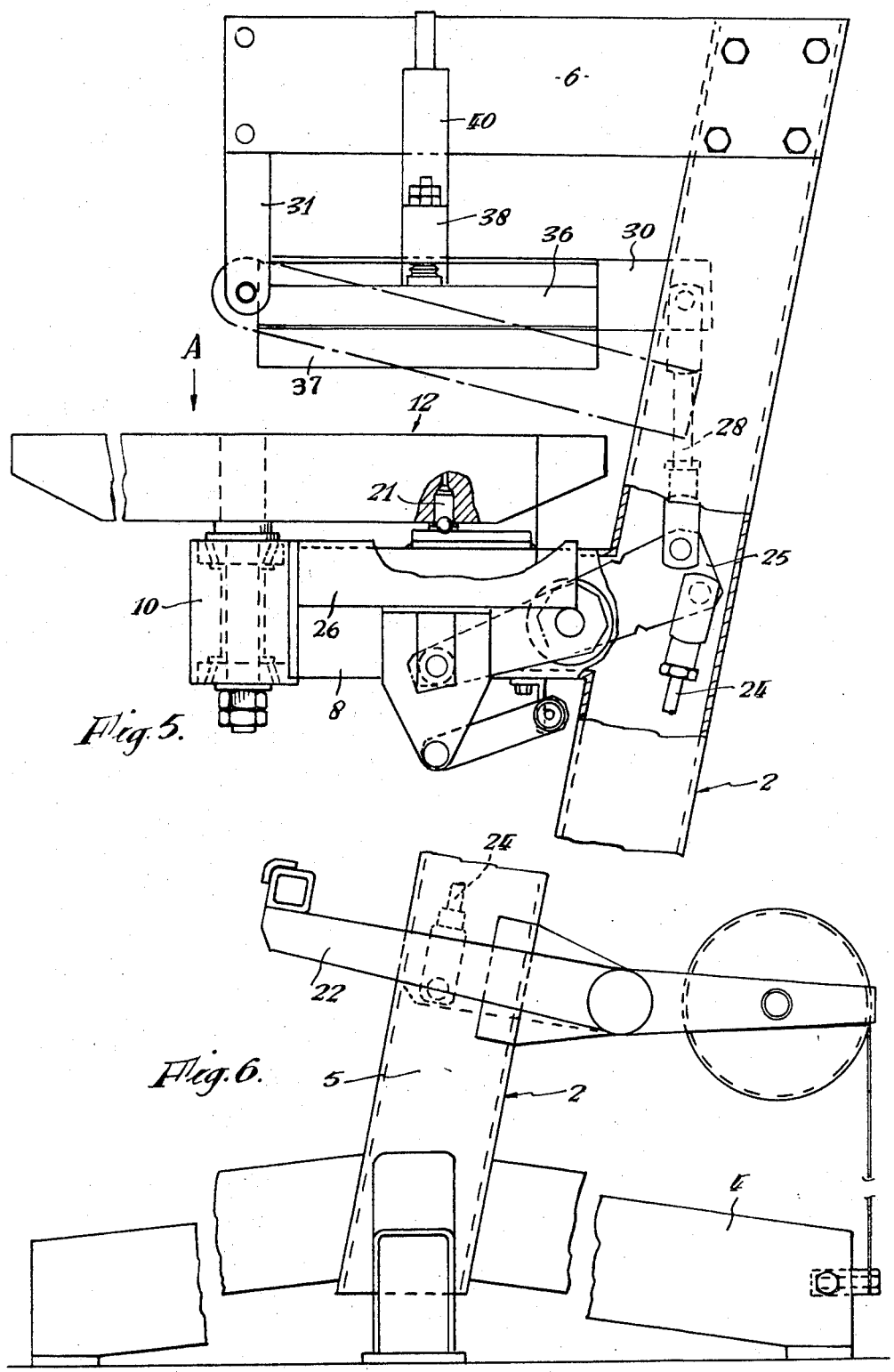

Aug. 11, 1970  W. G. COLLINS  3,523,403
MEANS FOR MAKING DISPLAY PACKAGES
Filed July 26, 1967

INVENTOR
WILLIAM GEORGE COLLINS
By Jacobs & Jacobs

United States Patent Office 3,523,403
Patented Aug. 11, 1970

1

3,523,403
MEANS FOR MAKING DISPLAY PACKAGES
William George Collins, West Horsley, England, assignor to The Shirley and Warbey Box Company Limited, London, England, a company of Great Britain and Northern Ireland
Filed July 26, 1967, Ser. No. 656,259
Claims priority, application Great Britain, Jan. 20, 1967, 3,185/67
Int. Cl. B65b 51/14, 51/32, 53/02
U.S. Cl. 53—373  2 Claims

ABSTRACT OF THE DISCLOSURE

The specification describes a machine for sealing display packages which have one or more transparent windows set in panels between which articles to be packaged are placed so that they are visible through the windows. The machine has a heating station for sealing the panels around the article or articles and conform the transparent window material over them. A cooling station, simultaneously operable with the heating station is also provided. The heating station is in the form of a pair of blocks which sandwich the package and the blocks are provided with replaceable heads so that they can be used for a variety of packages.

---

This invention relates to means for making display packages of the kind comprising a cardboard or like outer part forming front and back panels, at least one of said panels having an aperture and transparent material applied to the inner surface of the said panel extending over the aperture, and an article enclosed within the package by sealing the panels together, the article being visible through the said transparent material.

According to this invention we provide a machine for sealing packages of the kind described comprising a multistation turntable, having (a) at least one station adapted to accommodate an unsealed assembly of a front and a back panel having one or more articles to be packaged there-between, at least one inner panel surface being coated wholly or partly with heat sealable adhesive and at least the front panel of which assembly has an aperture and an unformed sheet of transparent heat stretchable material secured to the inner surface of the said front panel and extending over the aperture, (b) at least one heating station provided with heating means, said heat applied at the heating station being adapted to seal together said panels around said article and conform said film material tautly over said article, (c) at least one station provided with cooling means, and (d) means for simultaneously operating said heating and cooling means.

One form of machine for sealing packages according to this invention and one form of package which may be so sealed, will now be described with reference to the accompanying drawings, wherein:

FIG. 5 is a side elevation of the upper part of a package sealing machine partially cut away to show the ball locating device for the turntable.

FIG. 6 is a side elevation of the lower part of the machine.

FIG. 7 is a fragmentary plan view in the direction A in FIG. 5.

2

Figure 1:
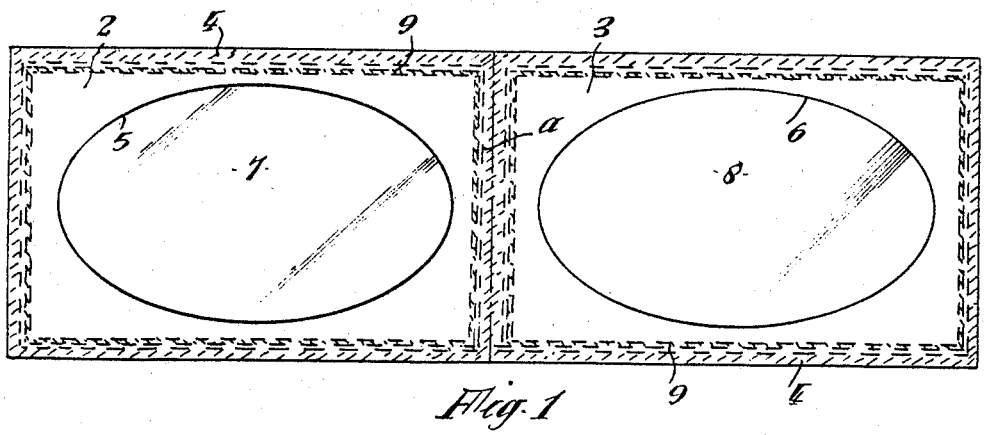
FIG. 1 shows the package in the opened out position before the article is placed therein.
Figure 2:
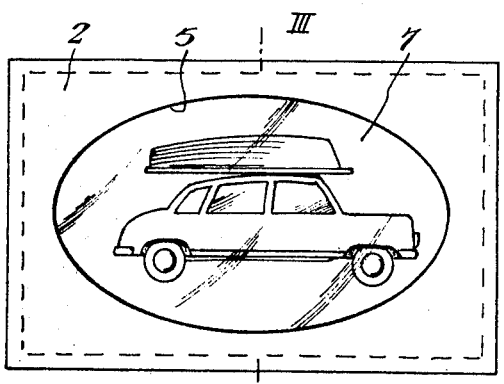
FIG. 2 is a front view of the package.
Figure 3:
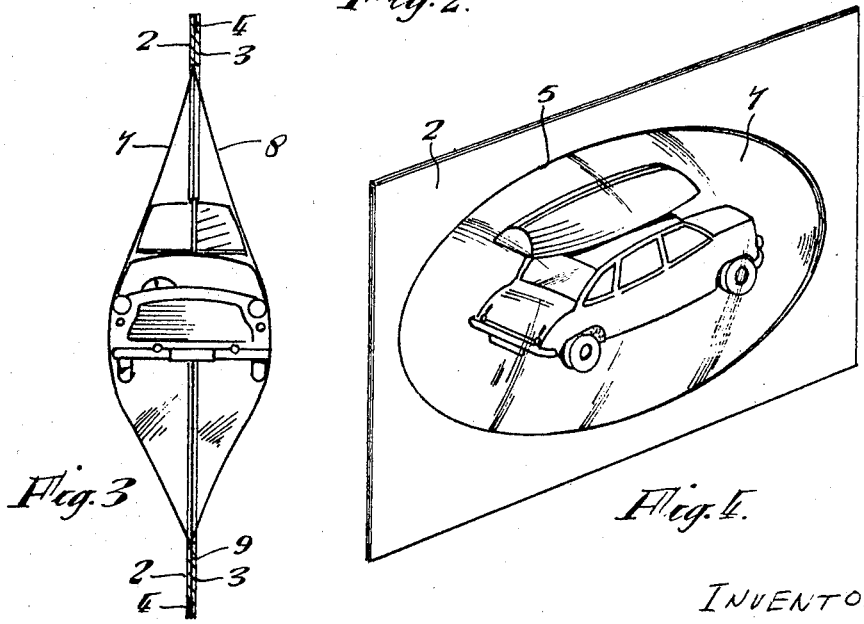
FIG. 3 is a section taken on line III—III of FIG. 2.
Figure 4:
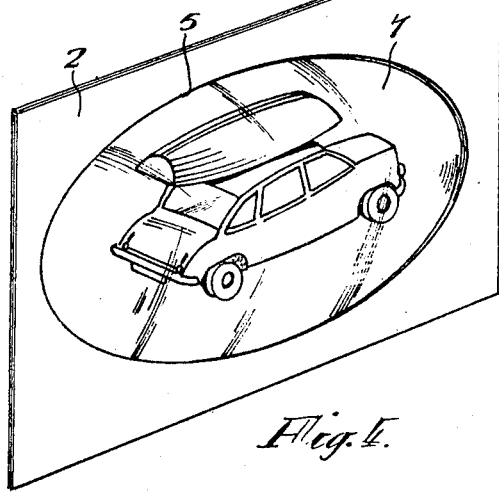
FIG. 4 is a perspective view of the package.
Figure 4:
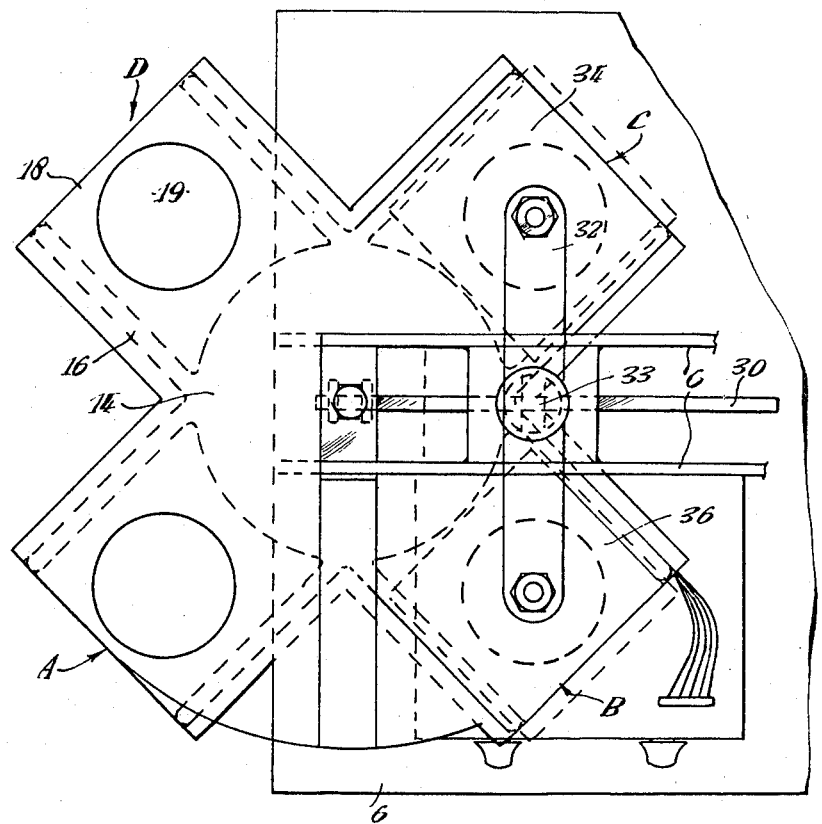

Referring to FIGS. 1 to 4 the package comprises a cardboard outer foldable about a center line a to form a front panel 2 and a back panel 3 each of which has a peripheral portion 4 coated on the inside with a heat sealable substance or contact adhesive. Each panel 2 and 3 has an aperture 5 and 6 respectively, which apertures are aligned when the package is closed. Patches 7 and 8 of either transparent cold stretch film material or a heat shrinkable variety are applied one to each of the inner surfaces of the panels 2 and 3 by means of applied adhesive indicated at 9. The package is sent home flat in this condition.

In use, the article to the packaged which in the case described is a toy motor car, is placed centrally between the two patches of film material by bringing the panels 2 and 3 face to face. The peripheral portions 4 of the panels 2 and 3 are united by heat and pressure which serves the double purpose of heat sealing together the panels 2 and 3 and of softing the film patches slightly to improve the stretchability of the film material. The packaged article is held firmly in its central position by means of the patches of film material which bear on the projecting sides of the car both at the front and the back of the package and retain the car in the desired position. It will be noted that there is an area of transparency surrounding the car giving the effect of an article mounted in a frame which enhances the display feature of the package. The article need not necessarily be held at the center of the openings which themselves may be of different contour from the oval shape shown.

The package may be provided with means for supporting it (not shown). Such means may comprise a hole through the cardboard outer to enable the package to be suspended. Alternatively, each of the bottom corner portions may be in the form of a triangular lug, the corners of which lugs project below the remainder of the outer. These lugs may be folded back about diagonal lines of weakening to make an angle of about 90° thus enabling the package to support itself in an upright position.

Instead of a patch of film material being applied to the back panel a different type of material may be substituted. In this case one relies only on the patch of stretchable or shrinkable film material on the front of the panel to hold the article against movement in the package.

The aperture in the back panel need not necessarily be of the same size as the aperture in the front panel.

The patch on the back panel may be woven fabric such as cotton or filaments made from man-made fibres or may be plastics material, metal foil or metallized film and can be flexible or not. If it is a stiff type of material then the effect of the patch on the back can be crinkled.

Although the packages have been described with reference to the display and packaging of a toy, it must be understood that there are many other kinds of articles for which the display packages are suitable, for example, small articles of hardware and items in the cosmetic field. If desired two or more articles may be packaged.

Figure 8:
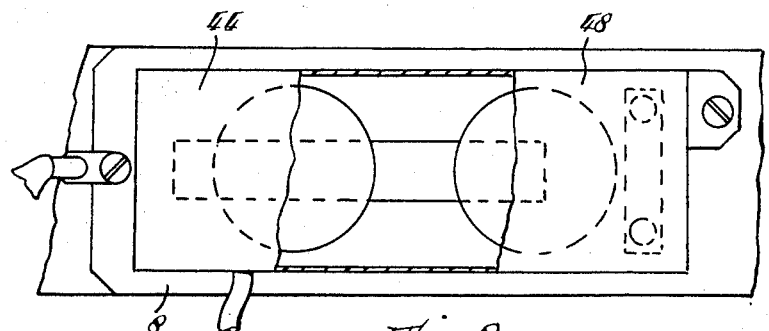
FIG. 8 is a side elevation of the machine electrical controls.

The machine for sealing display packages according to the invention is shown in FIGS. 5 to 8 and comprises a hollow inclined supporting column 2, terminating in supporting legs 4, the column having an upper projecting platform 6 and lower projecting platform 8. The lower platform 8 has rotatably mounted on it by means of a spindle 10, a turntable 12 which is of cross shape best seen in FIG. 7, and comprising a framework 14 carrying a jig board 16 of plywood or other suitable material. The jig board carries four pads 18, preferably of felt, each of which has an aperture 19 corresponding to an aperture in the jig board. The aperture 19 is of substantially the same dimensions as those of the apertures (if any) in the lower panel of a package to be sealed. The turntable 12 provides four stations, a loading station A, a heating station B, a cooling station C and an unloading station D.

The rotation of the turntable is controlled by a ball catch 21 situated on the lower platform 8. A package assembly or sealed package may be positioned on each of the felt pads 18 by means of retractable pins (not shown).

Pivoted to the lower portion 5 of the column 2 is a foot pedal 22 which is attached to a control rod 24 housed within the column 2. The upper portion of the control rod 24 is pivoted to a lever 25 which is attached to a lower heating block 26. The lever 25 is also pivotally attached through a linkage 28 to an arm 30 pivoted to an extension 31 depending from the upper platform 6. The arm 30 is centrally connected at 33 to a cross bar 32 (see FIG. 7) which carries at opposite ends of its underside a cooling block 34 and an upper heating block 36. An extension 38 extends from each of the blocks 34 and 36 into a bore 40 in the upper platform 6 and is held at its upper end by a return spring (not shown). Operation of the foot pedal 22 thus lowers the cross bar 32 carrying the blocks 34 and 36 which are raised by means of the spring when foot pressure is released. At the same time the lever 25 raises the lower block 26.

The heating blocks 26 and 36 and cooling block 34 are made of suitable heat conducting material such as a light alloy. The upper heating block 36 is hollow and is fitted with a removable metal plate 37 which clips over the block 36 and has an aperture which conforms substantially to the shape of the aperture in the top panel of the assembly to be sealed. This provides a clearance for the articles to be packaged when the blocks are brought into contact with the upper panel of the package and the plates may be readily replaced to accommodate other assemblies. The cooling block 34 is air cooled and is also hollowed out. The heating blocks 26 and 36 are both provided with separate heaters and are controlled by simmerstats 44 and 48 positioned in the side of the lower platform 8 (see FIG. 8). The lower platform 8 is cut away to accommodate the lower heated block 26 which may have a planar upper surface or be hollowed out dependent on the bulk of the assembly.

In operation, an unsealed assembly comprising for example two panels each having an aperture covered by a window of heat stretchable transparent film, is bent so that the two panels flank an article to be packaged and the article rests on the lower window. The non-windowed inner surfaces of the panels bear a layer of heat sealable adhesive. The assembly is positioned at station A on the felt pad 18 and the turntable is rotated until the assembly is at the heating station B. A plough guide (not shown) pivoted to the upper platform 6 may be provided to guide the upper panel over the article. Depression of the foot pedal 22 causes the heating blocks 26 and 36 to press the adhesive coated surfaces together to heat seal them. The article lodges within the cavities in the block 36 and the felt pad 18. Heat from both the block 36 and the lower heating block 26 causes the film to stretch around the article. When the foot pedal is released the block 36 is raised by the action of the return spring 42 and the block 26 is lowered. The turntable is then rotated to the cooling station C and depression of the pedal 22 causes the cooling block 34 to bear on the package and cool the film and adhesive, so that the film tautly holds the article and the panels are sealed together. Further rotation of the turntable allows the package to be unloaded at station D. Preferably the temperature of the upper heated block 36 is kept below that of the lower block 26 which does not come into such close contact with the assembly. Suitable temperatures are 130° C. and 250° C. for the upper and lower blocks respectively. As the heating and cooling blocks 36 and 34 operate simultaneously, the turntable may be loaded between each quarter revolution to provide a continuous process.

The machine may readily be adapted for use with alternative forms of package simply by replacing the plate 37 or by the replacement of the felt pads 18 and heating and cooling blocks 34 and 36 by pads and blocks of other dimensions and the repositioning of the retractable pins on the pads. Alternatively, the complete jig board 16 may be replaced. Packages with one or two transparent windows or with other forms of backing material such as fabric or metallized film may be produced. It is also possible to incorporate a layer of decorative backing material such as metal foil or woven fabric between the transparent panels at the filling station.

What I claim and desire to secure by Letters Patent is:

1. A machine for sealing packages of the kind described comprising a multi-station turntable, having
    (A) at least one loading station whereby the turntable can be loaded with an unsealed assembly of a front and back panel having one or more articles to be packaged there-between, at least one inner panel surface being coated wholly or partly with heat sealable adhesive and at least the front panel of which assembly has an aperture and an unformed sheet of transparent heat stretchable material secured to the inner surface of the said front panel and extending over the aperture,
    (B) at least one heating station,
    (C) heating means at said heating station comprising
        (i) a hollow upper heated block,
        (ii) a lower heated block,
        (iii) means for bringing said heated blocks into contact with said assembly whereby said assembly is sandwiched therebetween
        (iv) a plate on the lower face of said upper heated block,
        (v) an aperture in said plate of a shape which substantially conforms to the shape of the aperture in the upper panel of said assembly,
    whereby when said blocks are brought into contact with said assembly, the panels are sealed around said article and at the same time the transparent heat stretchable material extending over the aperture is heated and thus conformed tautly over said article,
    (D) at least one station provided with cooling means, and
    (E) means for simultaneously operating said heating and cooling means.

2. A machine for sealing packages according to claim 1 wherein said plate on the lower face of said upper heated block is removeable.

References Cited

UNITED STATES PATENTS

| 3,075,330 | 1/1963 | Swezey | 53—184 |
| 3,192,681 | 7/1965 | Greenbaum | 53—30 |
| 3,195,284 | 7/1965 | Crane | 53—184 X |
| 3,199,263 | 8/1965 | Lee | 53—373 X |
| 3,221,473 | 12/1965 | Brown | 53—373 |
| 3,238,691 | 3/1966 | Miller et al. | 53—3 |

THERON E. CONDON, Primary Examiner

R. L. SPRUILL, Assistant Examiner

U.S. Cl. X.R.

156—498, 583